Figure 3:
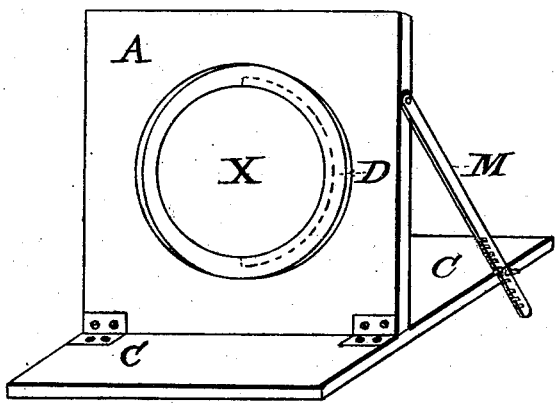

(Model.)   B. TITCOMB.   2 Sheets—Sheet 1.
SOLAR CAMERA.
No. 253,959.   Patented Feb. 21, 1882.
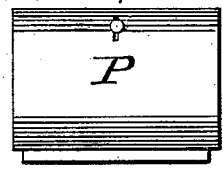
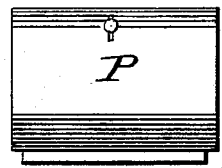
Fig. 2.
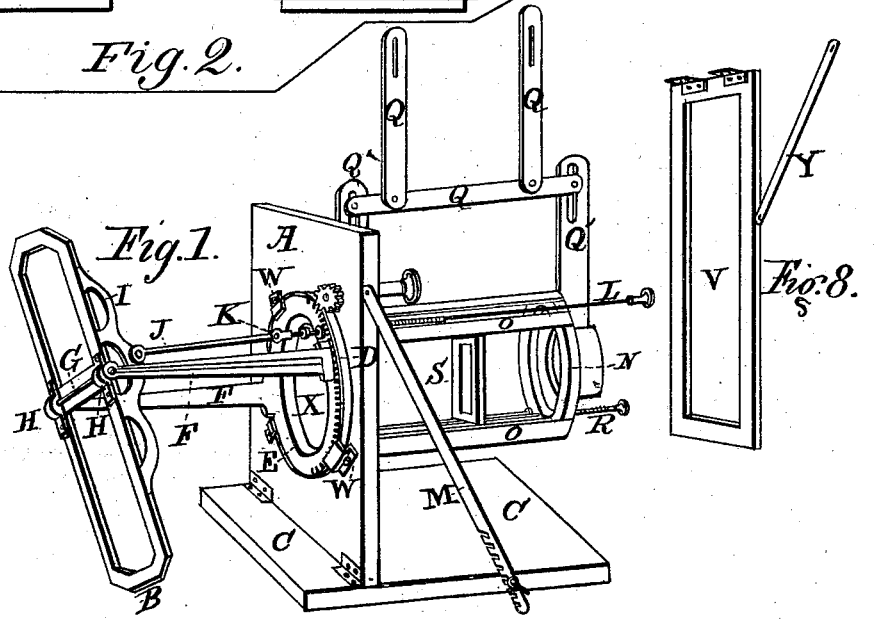
Fig. 1.   Fig. 3.
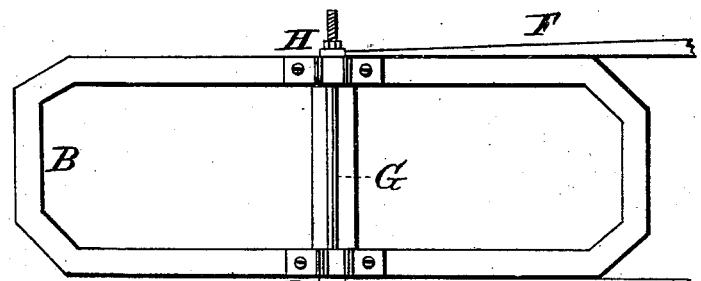
Fig. 4.
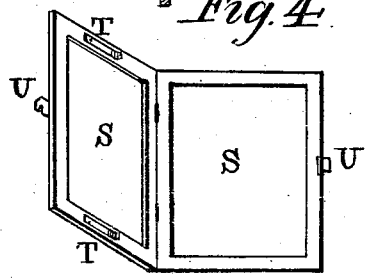
Fig. 5.
Witnesses:
Harry M. Benzinger
L. Bentty Graff
Inventor:
Benaiah Titcomb
N. PETERS, Photo-Lithographer, Washington, D. C.

(Model.)

2 Sheets—Sheet 2

B. TITCOMB.
SOLAR CAMERA.

No. 253,959.  Patented Feb. 21, 1882.

Witnesses:

Inventor:
Benaiah Titcomb

United States Patent Office.

BENAIAH TITCOMB, OF BALTIMORE, MARYLAND.

SOLAR CAMERA.

SPECIFICATION forming part of Letters Patent No. 253,959, dated February 21, 1882.

Application filed September 19, 1881. (Model.)

*To all whom it may concern:*

Be it known that I, BENAIAH TITCOMB, of the city of Baltimore, State of Maryland, have invented certain new and useful Improvements in Solar Cameras or Solar Microscopes; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates to improvements in solar cameras or solar microscopes for enlarging photographs, &c.; also, the manner of constructing an adjustable front plate and the devices connected therewith; also, the mode of constructing a skeleton-frame for the camera or microscope with movable doors and adjustable braces for suspending the camera from above; also, the manner of constructing a negative-holder.

My invention also consists in the construction of two arms securely bolted, one on each side of a semicircular cog-wheel. In the ends of these arms holes are drilled, and a shaft is fitted which extends across from one to the other. On this shaft shoulders are turned to suit the holes in the ends of the arms, and on each end of the shaft a thread is cut and a nut fitted. This connects the two arms permanently together. A space is left between the arms sufficiently wide to allow the mirror-frame to move freely. On the posterior side of the mirror-frame two boxes are attached, which are fitted to the shaft and are connected together with bolts. A brace is also attached to the side of the mirror-frame, which gives additional strength to the frame, the arm, the nut-joint, and the screw-rod being used to adjust the mirror.

My invention also consists in the mode of hanging the easel from above and the adjustable brace connected therewith.

The object of my invention is to construct a solar camera or solar microscope that will be durable, and so arranged that it cannot be disturbed by high winds in the relative position of its parts, and by this means insure a more perfect photograph when enlarged from small negatives, and to insure this result the platform is attached to the sill of the window, with the front plate hinged to the platform, the adjustable bar being attached to the side of the plate, and the arms are attached to the toothed wheel, and in this manner the mirror can be readily adjusted to any angle to suit the sun's rays at any season of the year. The stationary shaft connecting the mirror-arms together and the journal-boxes and side braces fitted on the mirror-frame give additional strength and make it more durable.

My invention also consists in the construction of a screw-rod and jointed connections to aid in adjusting the mirror, and in this manner there is less friction than in any other way that can be devised. The platform or frame that the front plate is hinged to is of small size, not larger than two feet square, and it is permanently attached to the sill of the window while the camera is operating. This is desirable, as it gives the operator more room to work in. On the front plate is a rim or flange made sufficiently large for the toothed wheel to work in. This also keeps the wheel in its proper place with the aid of small knee-joints bolted on the side of the rim and plate.

The skeleton-frame of the camera is constructed in such a manner with doors to fit the openings that they can be removed in a moment and the operator can examine the working of the camera from either side. The braces connected with the camera are so arranged that they can be suspended from a board attached to the ceiling near the upper part or frame of the window; or a frame and bars may be hinged to the side of the window-frame parallel with the front plate. This front plate is so arranged with the camera that it can be attached or detached in a moment when wanted. The desideratum is to place the camera proper in such a position that high winds will not interfere with its successful operation. This I accomplish by disconnecting the camera from the front plate and suspending it from the ceiling, and by this process the camera remains perfectly motionless.

The camera can be made octagonal in shape, if desired, without interfering with its operation.

My invention of the negative-holder is also simple in its construction, and it is so arranged that it will hold the negative exactly in the position in which it is placed.

My invention of the manner of constructing the adjustable easel that holds the sensitive paper and hanging it from above is also simple, and it can be arranged parallel with the camera in a few seconds.

I attain these objects by the mechanism illustrated in the accompanying drawings, in which—

Figure 6:
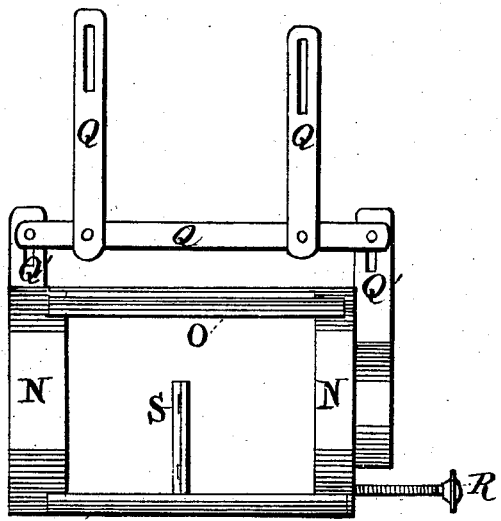
Figure 7:
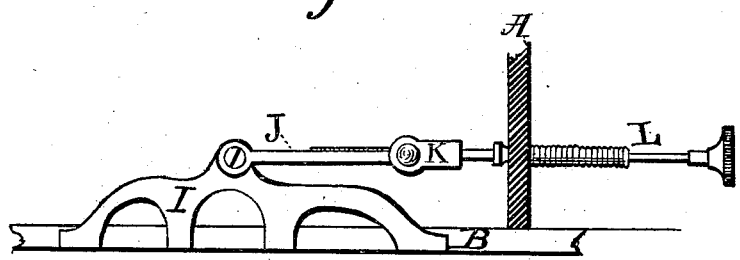

Figure 1 is a perspective view of the entire solar camera or microscope, excepting the doors, which are removed. Fig. 2 represents the doors removed from the camera. Fig. 3 shows the platform and the front plate hinged at its base, having an adjustable brace on its edge with bolt attached; Fig. 4, the mirror-frame and the shaft with the journal-boxes, arms, and screw-nuts; Fig. 5, the negative frame or holder with springs, latch, and fastenings disconnected; Fig. 6, the suspended skeleton-frame of the camera with the braces, cross-bars, and bolts; Fig. 7, the side brace of the mirror-frame with arm-joints, nut-bolts, and adjusting-rod; and Fig. 8, the adjustable hanging easel with side brace attached.

To enable others skilled in the art to make and use my invention, I proceed to describe the same.

First I construct the front plate, A, with the rim D for the purpose of retaining the toothed wheel E, and in this manner the cog-wheel works smoothly and easily. In the plate A there is a central opening, X. On one side of this opening a space is left sufficiently large for the adjustable rod L to move freely in. At the base of plate A is hinged the platform C. On the side of the plate A is an adjustable bar, M, with slots cut in one end, and a thumb-nut to suit, for the purpose of adjusting the plate A at any desired angle, and at equal distances apart are placed small plates or knee-joints W, attached by screws over the edge and rim of the wheel E, to keep it in its proper place and allow it to move freely and easily. On each side of the wheel E arms F F are bolted, and on the end of the arms F F holes are drilled, and on each end of the shaft G shoulders are formed to suit the holes in each arm, and a thread is cut on each end of the shaft, and nuts are fitted for the purpose of permanently connecting the arms F F, and between the arms there is provided sufficient space to allow the mirror-frame to move freely. On the posterior side of the mirror-frame B are two journal-boxes bolted stationary thereto, and of suitable size to work on the shaft G, and on the side of the mirror-frame B is permanently attached the brace I. This answers a double purpose of strengthening the mirror-frame and assisting in adjusting it to the sun's rays. Arm J and joint K are connected with a bolt. In joint K a thread is cut to suit the thread on the rod L. The skeleton-frame of the camera N N is connected together with rods or strips of iron O O. In the center of the camera is the negative-holder S, consisting of two frames hinged together with springs T T and catch or latch U, and on the openings of the frame of the skeleton-camera doors are fitted in such a manner that they can readily be removed in a moment, and to the camera are attached strips of iron or wood Q Q', bolted together and made adjustable and to suit the parallel plate A. These strips or bars are suspended from the ceiling. The camera can be attached to a frame hinged to the side of the window-frame. Either mode separates the camera proper from the front plate, A, and holds it permanent. The easel V is hinged to a small board attached to a sliding frame and suspended from above, and to the side of the easel V is attached the adjusting-brace Y, so arranged that it can be adjusted to suit the angle and parallel with the camera.

Having thus fully described my invention, what I claim as new, and desire to secure by Letters Patent, is—

1. In a solar camera, the adjusting-bars Q Q', for the purpose of suspending the same, constructed and arranged substantially as set forth.

2. The suspended easel V and adjustable brace Y, in combination with the skeleton-camera N N and adjustable plate A, substantially as and for the purpose set forth.

3. The shaft G and journal-boxes H H, in combination with the arms F F, toothed wheel E, mirror-brace I, adjustable arm J, joint K, and screw-rod L, arranged substantially as and for the purpose herein set forth.

4. The negative-holder S, springs T T, and latch U, in combination with the adjustable screw-rod R, arranged substantially as set forth.

In testimony that I claim the foregoing as my own I affix my signature in presence of two witnesses.

BENAIAH TITCOMB.

Witnesses:
HARRY M. BENZINGER,
G. BEATTY GROFF.